United States Patent [19]
Day et al.

[11] Patent Number: 5,189,547
[45] Date of Patent: Feb. 23, 1993

[54] ELECTRO-OPTICAL LIGHT MODULATOR DRIVEN BY A RESONANT ELECTRICAL CIRCUIT

[75] Inventors: Timothy Day, Mountain View; Robert A. Marsland, Jr., Cupertino, both of Calif.

[73] Assignee: New Focus, Inc., Mountain View, Calif.

[21] Appl. No.: 706,292

[22] Filed: May 28, 1991

[51] Int. Cl.[5] .................... G02F 1/03; H01L 41/04
[52] U.S. Cl. ............................ 359/245; 359/254; 310/320
[58] Field of Search .............. 332/139, 144, 147, 148; 359/245, 315, 84, 85, 279, 181, 183, 162, 163, 165, 198, 254, 264; 310/316, 320, 321

[56] References Cited

U.S. PATENT DOCUMENTS

| | | | |
|---|---|---|---|
| 1,830,322 | 11/1931 | Hund | 310/320 |
| 2,309,083 | 1/1943 | Usselman | 332/139 |
| 2,859,346 | 11/1958 | Firestone et al. | 310/320 |
| 3,521,942 | 7/1970 | Temple | 359/245 |

*Primary Examiner*—Eugene R. LaRoche
*Assistant Examiner*—Evelyn A. Lester
*Attorney, Agent, or Firm*—Majestic, Parsons, Siebert & Hsue

[57] ABSTRACT

A crystal exhibiting a variable index of refraction in response to a voltage applied across it is driven from a lower voltage signal generator through a passive resonant circuit. The resonant frequency of the circuit is tunable by hand in order to maximize the voltage applied to the crystal from a low voltage signal generator. The impedance of the circuit is also hand adjustable in order to match that of the signal generator. The crystal and driving circuit are packaged together in a single enclosure having optically transparent windows allowing a laser beam to pass through the crystal and be modulated by it according to the frequency of the signal generator.

9 Claims, 2 Drawing Sheets

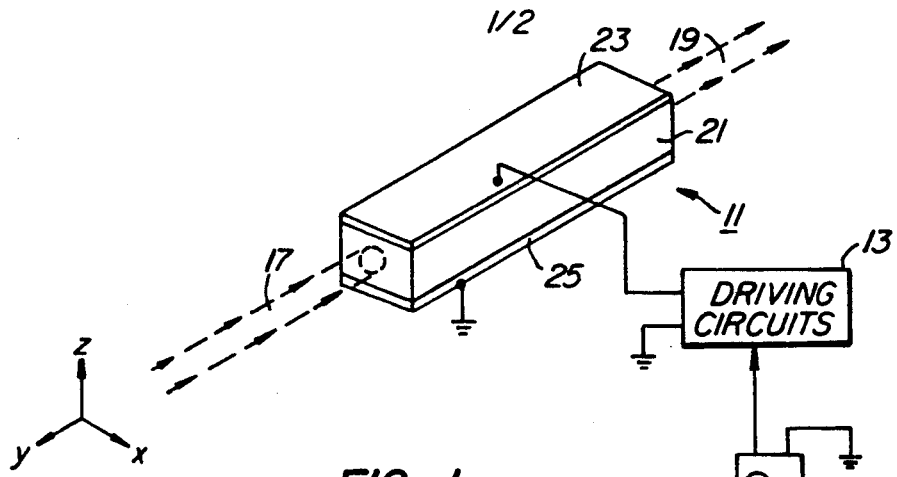
FIG. 1.
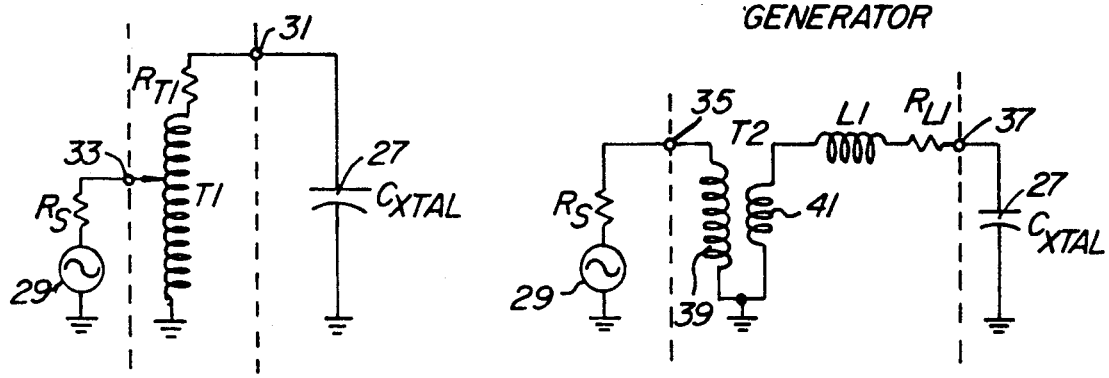
FIG. 2. PRIOR ART
FIG. 3. PRIOR ART
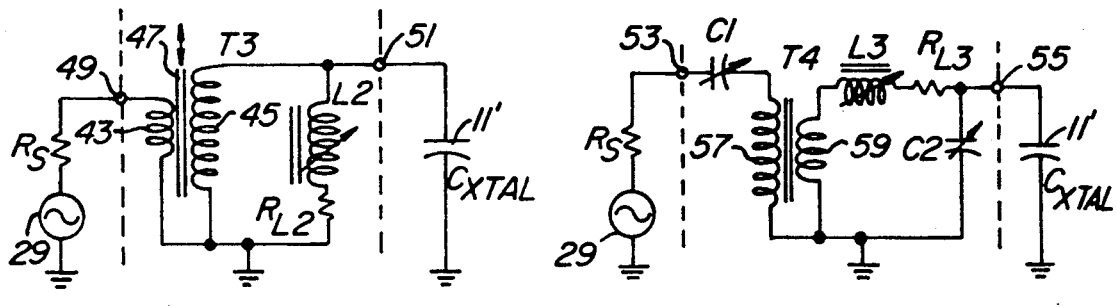
FIG. 4.
FIG. 5.

ELECTRO-OPTICAL LIGHT MODULATOR DRIVEN BY A RESONANT ELECTRICAL CIRCUIT

BACKGROUND OF THE INVENTION

This invention relates generally to electro-optical light modulators, and, more specifically, to driving circuits therefore and packaging thereof.

The optical modulation of a light beam by a fixed frequency sinusoidal waveform is useful in several applications. Primarily employed in a coherent optical system, a laser generated light beam is passed through a substantially transparent crystal material that is subjected to a large magnitude sinusoidal voltage across it. The frequency of the modulating signal is typically within a radio frequency ("r.f.") range for one class of applications, which extends essentially from about 1 megahertz ("MHz.") to 250 MHz. One type of crystal utilized in such modulators is characterized by varying its refractive index in proportion to the amount of voltage applied to it. Such a crystal alternatively changes the path length of the beam through it in accordance with the frequency of the driving voltage. Thus, a laser beam emerging from such a crystal is modulated by the frequency of the driving voltage. That light output, in the frequency domain, includes a center frequency spectrum of the incident light beam, along with side bands on either side of the center spectrum and separated from it by the frequency of the modulating voltage. Applications of such a modulated light beam include frequency stabilization of a laser and frequency modulated spectroscopy.

Typically, the source of the modulating signal is a standard signal generator which has an output of only a few volts, typically five volts. The crystal, on the other hand, requires a much higher voltage to operate. Several hundred volts are typically necessary to change the phase of the light beam though it by one-hundred eighty degrees. In order to increase the signal generator voltage to the higher level required to drive such a crystal, a separate voltage amplifier is generally utilized in commercial and scientific applications. Such an amplifier is usually physically large and rather expensive. As an active, powered device, such an amplifier needs to faithfully amplify the input signal from the signal generator without distortion.

As a replacement for such an amplifier, an approach utilizing a passive resonant driving circuit has been suggested. Such an approach is based upon the characteristic impedance of the optical crystal being substantially purely capacitive. Thus, it looks to the modulating signal driver like a capacitor. A low resistance inductor is connected in a manner and with a value that forms a circuit having a resonant frequency substantially that of the signal generator. The low voltage output of the signal generator at that resonant frequency then appears as a much higher voltage across the capacitive crystal load. The few signal generator output volts can easily be increased to several hundred volts necessary to drive such a modulating crystal. The driving circuit has its impedance matched to the output impedance of the signal generator by use of a transformer in order to avoid energy losses by reflections at that interface.

It is a primary object of the present invention to provide an improved resonant driving circuit which is more efficient and less complicated than those previously suggested.

It is another object of the present invention to provide improvements in the design of such a resonant driving circuit that makes it suitable for a commercial product by being easily manufacturable with standard available components.

It is a further object of the present invention to provide an improved optical modulator package suitable for a commercial product.

SUMMARY OF THE INVENTION

These and additional objects are accomplished by the various aspects of the present invention, wherein, briefly and generally, according to one aspect, components of the resonant crystal driving circuit are made adjustable and connected in a manner that allows precise adjustment of each such manufactured circuit to a given resonant frequency and with an input impedance that substantially matches that of the signal generator that will be providing the low voltage source of a modulating signal. According to a preferred embodiment, a driving circuit is provided where its resonant frequency and input impedance are largely independently controllable by separate adjustments. Since individual crystals and components will necessarily have varying electrical characteristics from item to item, the ability to adjust each modulator and driving circuit combination with a simple, expeditious procedure prior to shipment of the product assures that each such device has been optimized, without significantly increasing the cost to manufacture the product.

According to another aspect of the present invention, the passive resonant driving circuit is formed on a small printed circuit board that is included in the same package as the modulating crystal. Thus, both the driving circuit and the crystal can be radiation shielded by a single metallic case having a pair of small optical windows for the laser or other light to pass through. This small, single unit is then simply connected with an external signal generator and positioned in the path of the light beam to be modulated.

Additional objects, advantages and features of the various aspects of the present invention will become apparent from the following description of its preferred embodiments, which description should be taken in conjunction with the accompanying drawings.

BRIEF DESCRIPTION OF THE DRAWINGS

FIG. 1 illustrates generally an electro-optical modulator system that can utilize the various aspects of the present invention;

FIGS. 2 and 3 schematically illustrate systems utilizing two different resonant driving circuits that have been suggested by others;

FIG. 4 schematically illustrates an adjustable parallel resonant circuit;

FIG. 5 schematically illustrates an adjustable series resonant driving circuit.

DESCRIPTION OF THE PREFERRED EMBODIMENTS

Figure 6:
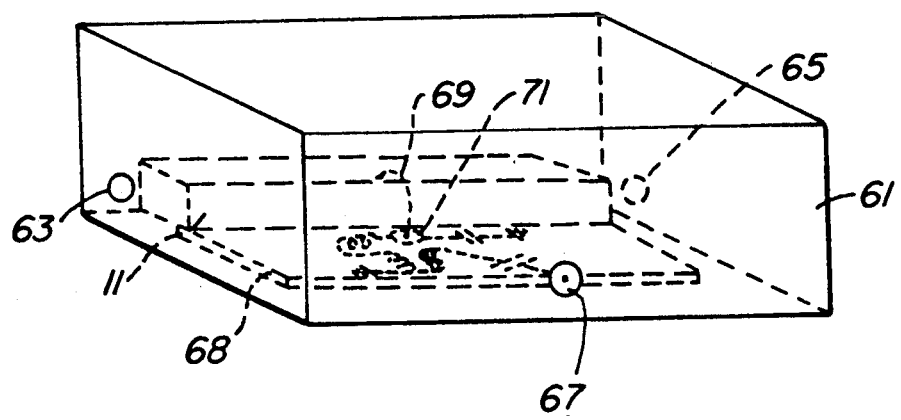
FIG. 6 shows a physical package of a modulating crystal and resonant circuit together.

Referring initially to FIG. 1, a system including a modulating crystal structure 11, driving electrical circuits therefore, and a signal generator 15 are illustrated. A small diameter light beam 17, such as one from a laser source, enters one end of the crystal structure 11 and emerges at another end as a modulated light beam 19.

The particular modulating structure 11 illustrated in FIG. 1 utilizes a grown crystal 21 cut into a rectilinear shape and has gold electrodes 23 and 25 attached to opposite planar surfaces thereof. It is when an alternating voltage of sufficient magnitude is applied across the crystal by these electrodes from the driving circuits 13 that the refractive index of the crystal material 21 is caused to change and modulate the incident light beam 17. The material for the crystal 21 is selected from known materials such as lithium niabate or lithium tantalate. The crystal 21 is cut from material having been grown in the z axis as indicated. Its dimension in the z axis is kept as small as possible, consistent with the size of the light beam 17 to pass through it, in order to minimize the level of voltage that needs to be applied to attain the desired light modulation.

The possibility of employing a passive resonant circuit as the driving circuit 13 arises because such crystal materials appear to the driving circuits as a substantially pure capacitive load. One such driving circuit previously suggested by others is illustrated in FIG. 2. A light modulating crystal, different from the crystal 11 of FIG. 1 but generally sharing its electrical characteristics, is indicated by its equivalent capacitance 27. A standard signal generator is indicated by a series combination of a signal source 29 and a series characteristic impedance $R_s$. An autotransformer T1 is connected across the crystal 27. A combination of the inductance of the transformer T1 and the crystal form a circuit that is resonant at a given frequency, selected to be substantially equal to the single frequency of the source 29. A voltage of several hundred volts can be developed between a node 31 and ground potential, across the crystal 27, from an input voltage of approximately 5 volts between a node 33 and ground potential.

The node 33 is connected to the proper winding of the autotransformer T1 in order to match the impedance of the driving/crystal circuit at node 33 to $R_s$ of the signal generator at that node. A significant difficulty in commercializing the driving circuit of FIG. 2 is that connection of node 33 with the transformer T2 in order to match impedances also affects the resonant frequency of the circuit, so optimization of both these quantities is extremely difficult.

Referring to FIG. 3, another resonant driving circuit of a form previously commercially utilized includes a transformer T2 and series connected inductor L1, with its resistance separately shown as $R_{L1}$, between nodes 35 and 37. The transformer T2 has a primary winding 39 connected across a signal generator source, and a secondary winding 41. The value of the inductance L1 is chosen primarily to form a resonant circuit with the crystal's capacitance 27 that is resonant at a desired given frequency. The ratio of the number of turns of the windings 39 and 41 is chosen primarily to match the impedance of the driving circuit/crystal at node 35 to that of the signal generator source. However, these parameters are not independent of each other. That is, changing the turns ratio of the transformer T2 in order to control the input impedance of the circuit also affects its resonant frequency somewhat. Similarly, changing the size of the inductor L1 in order to control the resonant frequency also causes the circuit's input impedance at terminal 25 to change since its resistance $R_{L1}$ also changes. As a result, it is very difficult to optimize the driving circuit of FIG. 3.

One improvement, according to one aspect of the present invention, is to provide some adjustability of the value of the components of the driving resonant circuit so that each one can be optimized for a particular modulating crystal and combination of components to obtain the desired resonant frequency and signal source impedance match. A transformer T3 having a primary winding 43 and secondary winding 45 has a metallic core 47 that is adjustable by movement in order to control the coupling between these windings. An inductor L2 is also made to be hand-adjustable as to its inductance by a movable metallic core. The inductance L2, and its associated resistance, $R_{L2}$, are connected in parallel with both the secondary winding 45 and the optical crystal structure of the type illustrated in FIG. 1, shown by its equivalent capacitance 11'.

Such a driving circuit, between nodes 49 and 51, can thus be optimized by hand adjustment. However, since each of the adjustments of the transformer core 41 and value of the inductor L2 affects each of the quantities of resonant frequency and input impedance desired to be optimized, it is necessary to iteratively adjust them. Although the adjustment of the resonant frequency and impedance eventually converge, it can require a tedious adjustment process.

A driving circuit illustrated in FIG. 5 between nodes 53 and 55 is provided to have easier adjustability and is more manufacturable than that of FIG. 4. A transformer T4, also provided for impedance matching purposes, includes a primary winding 57 and a secondary winding 59. The transformer T4 in this embodiment is not adjustable. Its primary winding 57 is connected to the input node 53 through a first hand-adjustable capacitance C1. An adjustable inductor L3, having an inherent resistance $R_{L3}$, is connected in series with the secondary winding 59 and the crystal 11'. Further adjustability is provided by a second capacitor C2 that is connected in parallel with the crystal 11'. The capacitor C2 may be selected to be of a type that is substantially continuously adjustable in value by hand turning of a screw, for example, or, alternatively, may be made adjustable by providing a socket in which a fixed value capacitor is positioned, the value of capacitance being changed by hand replacement of these fixed value capacitors until the optimal value is found. These forms of adjustability may also be employed for the other components of FIGS. 4 and 5 which are indicated to be adjustable.

Values of capacitance C1 and C2, and value of the inductor L3 are initially set during the manufacturing process to nominally optimize the resonant frequency and impedance of the circuit to that of the signal generator 29. However, variations of crystals and electronic components require a final hand adjustment in the manufacturing process before shipment. The resonant frequency of the circuit of FIG. 5 is first adjusted by hand-adjusting the inductance L2 and capacitance C2. Capacitance C1 is then adjusted to optimize the impedance match between the circuit and the signal generator. It has been found that this adjustment also affects somewhat the resonant frequency of the circuit but not severely. Therefore, as a next step, the inductor L2 and capacitance C2 are again adjusted to cause the circuit to resonate at the desired given frequency of the signal source 29. It has been found that this is all the adjustment that is necessary, although in extreme cases, further iterations of these adjustments may be required.

The driving circuit of FIG. 5 is much simpler to optimize than the circuit of FIG. 4, the latter of which generally requires many successive cycles of alternatively adjusting the inductance L2 and the coupling of the transformer T3.

The series circuit of FIG. 5 has a further advantage in utilizing a step-down transformer T4, rather than a step-up transformer T3 of the FIG. 4 circuit. Fewer turns are required in the step-down transformer T4 secondary winding, while the primary winding may remain about the same as that in the T3 transformer. A reduction of the number of turns in the windings reduces the amount of energy lost in the transformer to radio frequency signals. Further, the ratio of turns of the step-down transformer T4 in the circuit of FIG. 5 can be selected to be within a range that is commercially available and practical while the ratio of turns of the step-up transformer T3 in the circuit of FIG. 4 is usually outside of this range. A transformer having a turns ratio in excess of about six-to-one performs poorly at the r.f. frequencies contemplated here because of very high current densities and resultant losses. The transformer T3 must then be specially manufactured, thereby adding to the cost of that driving circuit embodiment, and cannot be made to operate optimally.

FIG. 6 illustrates in general terms a preferred physical package of an electro-optical modulator. A metallic enclosure 61 carries the crystal structure within it. In order to provide an effective shield to electromagnetic radiation, the case 61 completely encloses the contents within it, except for small optical windows 63 and 65 on opposite sides thereof through which the light beam passes. This shielding keeps electromagnetic radiation generated by the driving circuit and crystal from undesireably escaping the package, and also keeps strong external fields from affecting operation of the driving circuit and crystal. The crystal structure 11 is positioned inbetween the windows 63 and 65. Because of the high index of refraction of the crystal material 21, its ends are preferably coated with an anti-reflection coating.

Rather than packaging the crystal in one enclosure and the driving circuit in another, the driving circuit is included within the package 61 in order to provide a single, compact electro-optical modulator. A connector 67 on one side of the case 61 provides for connecting a low voltage signal generator to it. This is the only electrical connection that is required to drive the crystal. Within the enclosure 61 is a small printed circuit board 68 on which the components of the driving circuit of FIG. 5 are mounted. A lead wire 69 connects one of the crystal electrodes to a connection pad 71 on the circuit board 68, while the other electrode on the bottom side of the crystal structure contacts another pad (not shown) on the board 68. The inductor and capacitor adjustments are made on the printed circuit board 67 before the enclosure 61 is sealed.

Although the various aspects of the present invention have been described with respect to its preferred embodiments, it will be understood that the invention is entitled to protection within the full scope of the appended claims.

It is claimed:

1. A driving circuit connected to an optical phase modulating crystal that presents a capacitive load to the circuit, comprising:
   a transformer having a primary winding and a secondary winding,
   means connected to one terminal of the primary winding for providing a first manually selectable capacitance in series with the primary winding and a source of a radio frequency signal,
   means connected as part of a series circuit with said transformer secondary winding and said crystal for providing a manually selectable inductance therein, and
   means connected in parallel with said crystal for providing a second manually selectable capacitance thereacross,
   whereby an overall impedance and resonant frequency of the circuit is controllable over a limited range by selection of the inductance, first capacitance and second capacitance values.

2. The driving circuit according to claim 1 wherein said transformer is characterized by having a number of turns of its said primary winding that is significantly more than a number of turns of its said secondary winding.

3. A driving circuit connected to an optical phase modulating crystal that presents a capacitive load to the circuit, comprising:
   a transformer having a primary winding adapted to be connected to a radio frequency signal source, a secondary winding adapted for connection to said crystal, and means for allowing adjustment of an amount of coupling between said primary and secondary windings, and
   means connected across said transformer secondary winding for providing a manually selectable inductance thereacross,
   whereby an overall impedance and resonant frequency of the circuit is controllable over a limited range by adjustment of the transformer coupling adjustment means and the selectable inductance.

4. An electro-optical modulator, comprising:
   an enclosure having a pair of windows on opposite sides thereof along an optical axis passing therethrough,
   a crystal positioned within the enclosure along said optical axis and characterized by being substantially transparent with a refractive index that varies in proportion to an amount of voltage that is applied across said crystal at driving terminals thereof and which presents a capacitive load across said driving terminals,
   an electrical connector carried by said enclosure in a manner allowing connection with a signal generator outside of said enclosure,
   a printed circuit board positioned within said enclosure and connected with said crystal and said signal generator connector, and
   a passing resonant driving circuit carried by said printed circuit board and interconnecting said crystal driving terminals and said electrical connector in a manner to provide a voltage across the crystal that is much greater than that received at said connector from a signal generator, said driving circuit including means providing at least one manually adjustable inductor for tuning the resonant frequency of said driving circuit.

5. The electro-optical modulator according to claim 4 wherein said tuning means of said driving circuit is connected in series with the crystal and a secondary winding of a transformer provided on said circuit board, a primary winding of said transformer being connected with said electrical connector.

6. The electro-optical modulator according to claim 5 wherein said driving circuit additionally includes means connected across said crystal terminals for providing a manually selectable level of capacitance thereacross.

7. The electro-optical modulator according to claim 6 wherein said driving circuit additionally includes means including a manually selectable capacitance value connected in series with the transformer primary winding and said electrical connector to provide a fine adjustment of the impedance and resonant frequency of the driving circuit at said electrical connector.

8. The electro-optical modulator according to claim 4 wherein said tuning means of said driving circuit is connected across said crystal terminals electrically parallel with said crystal.

9. A method of electrically driving an optical phase modulating crystal from a source of a radio frequency signal of a given frequency, comprising the steps of:
providing a transformer having primary and secondary winding terminals,
connecting said crystal to the transformer secondary winding terminals in series with an inductance and with a first capacitance connected in parallel with said crystal,
connecting the radio frequency signal source to the transformer primary winding terminals through a second capacitance,
adjusting values of said inductance and first capacitance until the combination of the series circuit and the first capacitance exhibits a resonant frequency substantially equal to said given frequency,
thereafter adjusting the second capacitance to substantially match an impedance of the radio frequency source, wherein the resonant frequency of the series circuit and the first capacitance is caused to move somewhat from said given frequency, and
thereafter further adjusting said inductance and said first capacitance in a manner to restore the resonant frequency of the series circuit and first capacitance substantially to said given frequency, whereby the resonant frequency and impedance are substantially optimized.

* * * * *

UNITED STATES PATENT AND TRADEMARK OFFICE
CERTIFICATE OF CORRECTION

PATENT NO. : 5,189,547
DATED : February 23, 1993
INVENTOR(S) : Day et al.

It is certified that error appears in the above-identified patent and that said Letters Patent is hereby corrected as shown below:

Column 6, line 52, in Claim 4:   Replace "passing" with --passive--

Signed and Sealed this

Thirtieth Day of November, 1993

Attest:

BRUCE LEHMAN

Attesting Officer

Commissioner of Patents and Trademarks